July 11, 1961
H. P. CAUDLE ET AL
2,991,656
DEVICE FOR IMPARTING A PREDETERMINED
PATTERN OF MOVEMENT TO AN ELEMENT
Original Filed Feb. 11, 1957
2 Sheets-Sheet 1
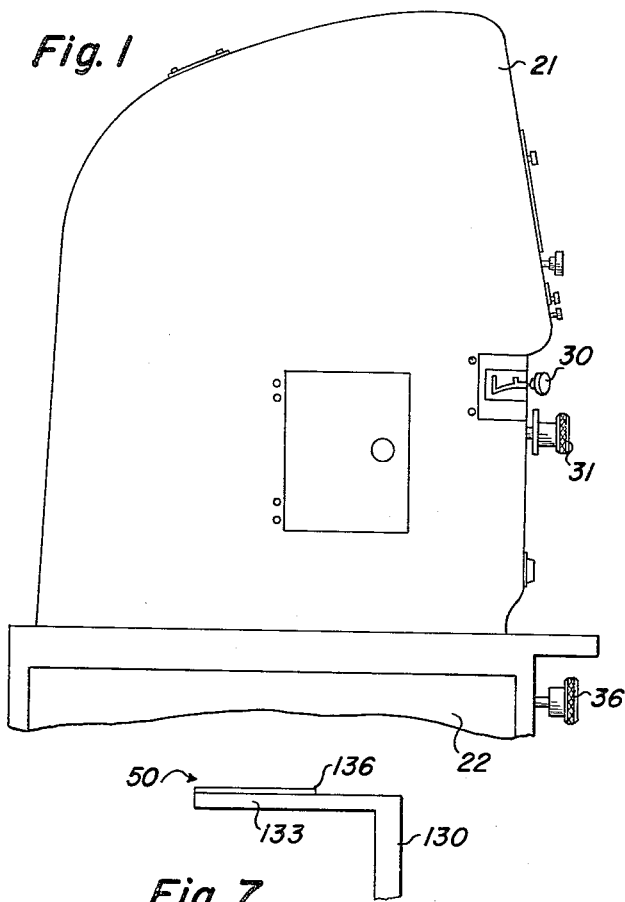
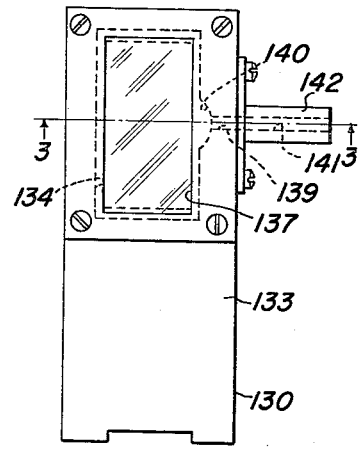
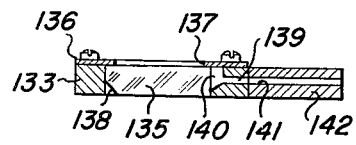
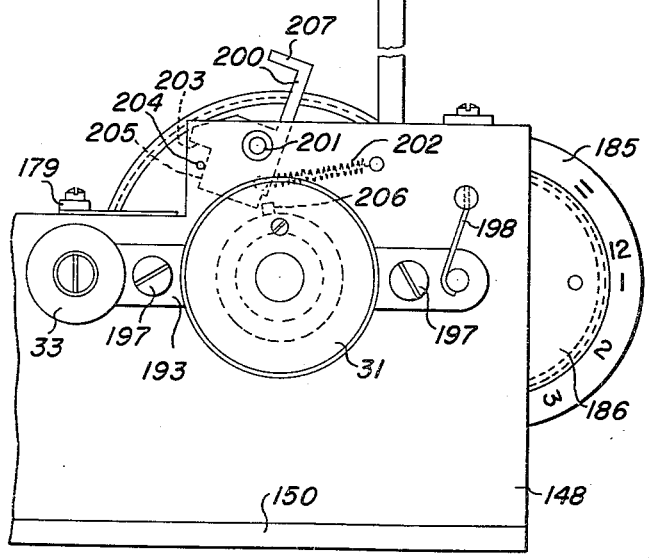
HOWARD P. CAUDLE
JOHN H. McGRATH
ROBERT E. THIESER,
INVENTORS
BY
ATTORNEY & AGENT

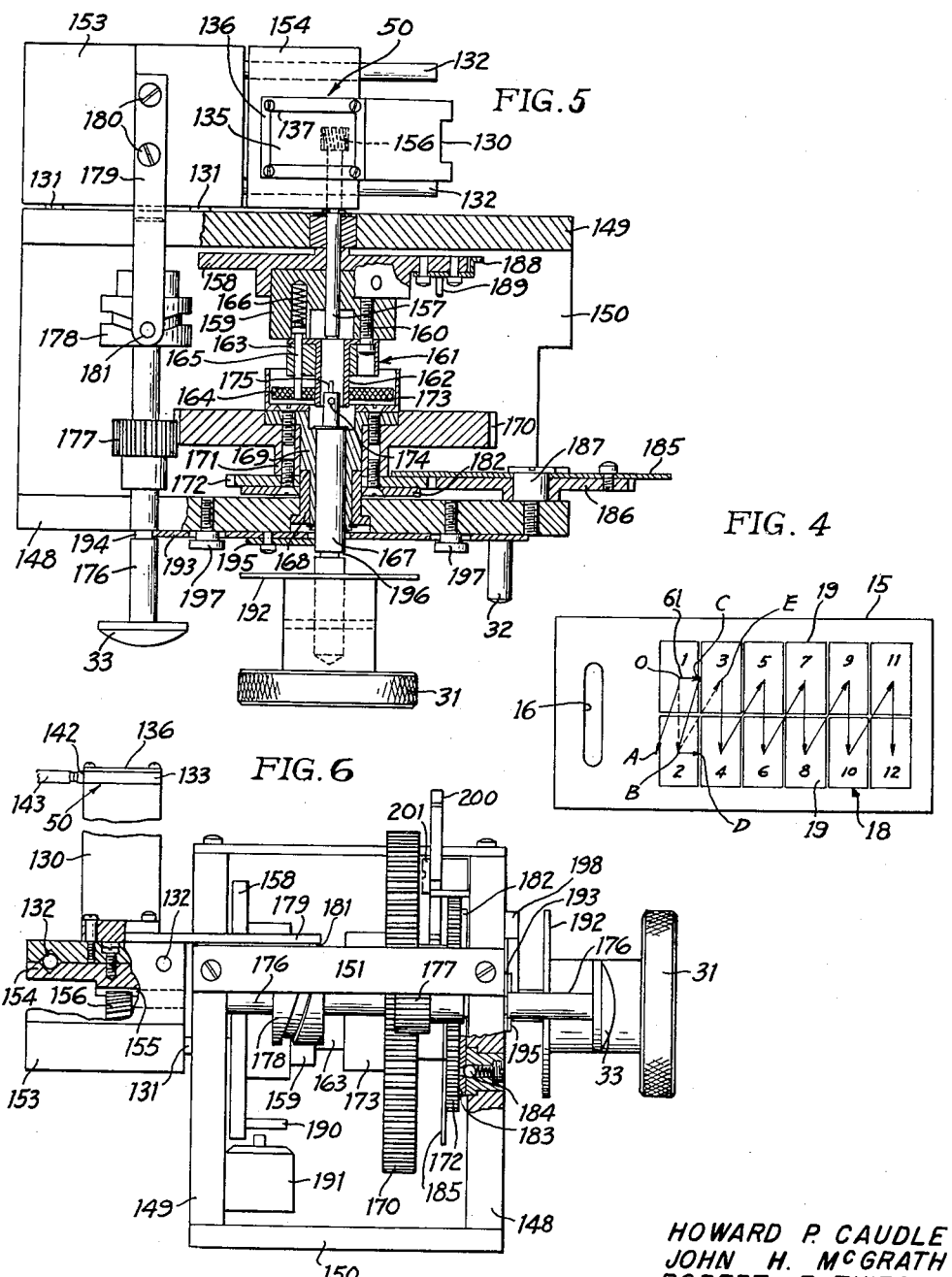

2,991,656
DEVICE FOR IMPARTING A PREDETERMINED PATTERN OF MOVEMENT TO AN ELEMENT
Howard P. Caudle, John H. McGrath, and Robert E. Thieser, Rochester, N.Y., assignors to Eastman Kodak Company, Rochester, N.Y., a corporation of New Jersey
Original application Feb. 11, 1957, Ser. No. 639,560. Divided and this application Dec. 12, 1958, Ser. No. 780,160
8 Claims. (Cl. 74—1)

The invention relates to a device for imparting a predetermined pattern of movement to an element and more particularly to such a device for moving a photographic element having one or more images with respect to the axis of an optical projection system so as to view the images, without handling, successively and in a predetermined order. This application is a division of our copending application Serial No. 639,560, filed February 11, 1957, which issued as U.S. Patent 2,911,884 on November 10, 1959.

The apparatus described herein is particularly adapted to handle small, discrete pieces of film which are of such size as to be incapable of being manually manipulated. Since the pieces of film are small and each piece of film can contain from two to twelve images arranged in pairs longitudinally of the film, it can be readily appreciated that such film does not readily lend itself to manual handling and/or orientation. In the above-mentioned patent there is disclosed and described an apparatus which provides for automatic manipulation of each photographic element from a supply station to a viewing station, from the viewing station to a perforating station or one of two receiving stations, or from said supply station to one of the receiving stations. To accomplish this movement of each discrete photographic element between the various stations, the operator manipulates a single lever, which is attached to a transport means, with respect to indicated positions. When the lever is successively positioned in the indicated positions in a predetermined order, the photographic element is automatically withdrawn from the supply station for movement by the transport to any one of the other stations. When the transport is moved into the viewing position the element thereon is automatically transferred to the viewing station, the transport then being withdrawn. Upon reinsertion of the transport into the viewing position the element is transferred back to the transport. By means of an intermittent drive connected to the viewing station, the element, when positioned therein, is moved in a predetermined pattern to successively align the images on the element with the optical axis of the projection system, this drive being the subject of the present application. During viewing, selection of the images is made and a group of punches are then conditioned to properly perforate the element. When the element is moved into perforating station the punches are activated and the film is perforated. On movement of the transport into the relation with respect to one of the receiving stations, the punches are reset and the element is inserted in the receiving station.

The primary object of the invention is to provide a device by which the element arranged in the viewing station is moved in a predetermined pattern to successively align the images on the element in a predetermined order with respect to the axis of a projecting system.

A further object of the invention is to provide a device for imparting a movement to the element, when arranged in the viewing station, whereby the resultant path of movement of the element is the vector sum of two different movements.

And yet another object of the invention is to provide a device for imparting a movement to the element, when arranged in the viewing station, in which said viewing station is mounted for movement in two directions with a first means connected thereto for moving said viewing station in one direction and resolving movement thereof in the other direction into oblique movement, a second means connected thereto for moving said viewing station in the other direction and a drive means interconnecting the first and second means whereby the resultant movement of the element in the viewing station is the vector sum of the movement in the one direction and the oblique movement.

Other objects and advantages of the invention will be readily apparent to those skilled in the art by the description which follows.

Reference is now made to the accompanying drawings wherein like reference numbers designate like parts and wherein:

FIG. 1 is a side elevation of the apparatus in which the present invention is embodied;

FIGS. 2 and 3 are detail views of the viewing station, FIG. 3 being a vertical section taken substantially along the line 3—3 of FIG. 2;

FIG. 4 is a detail view of a photographic element showing the pattern of movement thereof for aligning the images with the optical axis; and FIGS. 5, 6, and 7 are a horizontal section, front and side elevation views, respectively of the mechanism for imparting intermittent movement to the viewing station to successively and in a predetermined order align the images on the element with the optical axis.

The apparatus disclosed in FIG. 1 and more completely disclosed and described in the above-mentioned patent is merely illustrative of one type of apparatus in which the invention can be used. While a specific type of photographic element is utilized for illustrative purposes, it will be readily apparent to those skilled in the art that the apparatus can be easily and readily changed to accommodate it to other uses within other apparatus.

With reference to FIG. 4 the photographic element 15 comprises a negative film of a size approximately ⅝" in width and 1¼" long. It is readily apparent that such a small piece of film presents a problem if it is to be handled manually or oriented by hand. Such a piece of film is provided with an elongated slot 16 adjacent one edge, has a code area (not shown) and an image area 18. The element 15 can contain from one to twelve images 19 and/or from ten to sixty-six columns of code. With sixty-one to sixty-six columns of code, however, the element will contain no images 19 and since the invention is concerned with viewing images 19 the latter case of all code can be discarded. It will be noted from FIG. 4 that images 19 are arranged in pairs longitudinally of element 15 and the device about to be described serves to position each of images 19 with respect to the optical axis of the apparatus shown in FIG. 1 so as to successively and in a predetermined order project the images on an element onto a screen to permit the operator to select the desired images and to identify the selected images as discussed in our above-mentioned patent.

As shown in FIG. 1, the projection apparatus comprises a cabinet 21 which is mounted on a phase 22 provided with a knee-hole (not shown) which permits the operator to sit in a position directly in front of a screen which is mounted to the rear and to the right-side of cabinet 21. The projection system as well as the element transporting and handling mechanism is contained in cabinet 21. On the front of cabinet 21 the various operating and control knobs are arranged within reach of the operator. The element is moved with respect to the several stations by means of knob 30 and movement of the element with respect to the optical axis to successively project each image 19 on the screen in a predetermined order is accomplished by knob 31. Movement of the element for purposes of scanning is accomplished by pushing knob 31 inwardly to release lock button 32 to permit rotation of knob 31 and movement of scan knob 33 independently of each other. On the base 22 a knob 36 is arranged on the front thereof to tilt cabinet 21 and thus position the screen in the most convenient viewing position for the operator. The function and purpose of the aforementioned control knobs as well as others shown in FIG. 1 will be more readily apparent with reference to the above-mentioned patent.

With reference particularly to FIGS. 2 and 3, viewing station 50 comprises a C-shaped bracket 130 which is mounted on parallel rods 131 and 132 for movement in directions normal to each other, as will be described hereinafter. The upper extension 133 of bracket 130 is provided with an aperture 134 in which a glass platen 135 is cemented in position with one face thereof in the plane of the underside of said extension. An aperture plate 136 is secured to the opposite surface and has an aperture 137 corresponding to the image area 18. Glass platen 135 has the four sides thereof bevelled as at 138, and on one side of extension 133 a hole 139 connects with recess 140 which, when an element is positioned against platen 135, provides a channel around said platen. Hole 139 aligns with the hole 141 in adapter 142 which is secured to the side of extension 133. Adapter 142 is connected by a flexible hose via a solenoid valve which, in turn, is connected by another hose to a vacuum pump, as disclosed in the above-mentioned patent.

When an element 15 has been withdrawn from the supply receptacle by the perforated portion on the transport means, it is then moved to the viewing station where element 15 is then positioned between glass platen 135 and the plate on the perforated portion. At this instant, the vacuum is switched from the transport means to extension 133 to exhaust the air in the channel around platen 135 formed by the bevel thereon, the aperture 134 and element 15. The transport means can, therefore, be moved out of position with respect to viewing station 50 and element 15 is retained in position for projection of the images thereon onto the screen.

Adjacent the front wall of cabinet 21, a mechanism is arranged for imparting movement to viewing station 50 for viewing images 19 successively and in a predetermined order. This mechanism is mounted between plates 148 and 149 which are mounted on bottom plate 150 and strips and between cross members in cabinet 21. Extending rearwardly from plate 149 are parallel rods 131 on which block 153 is slidably mounted. Block 153, in turn, carries parallel rods 132 on which the mounting block 154 is slidably mounted. Bracket 130 which carries glass platen 135 is secured to the top of block 154 and a housing is arranged between the extension 133 of bracket 130 and block 154 as shown in the above-mentioned patent. On the underside of block 154, a helical rack 155 is mounted or formed integral therewith and has a helical pinion 156 meshing therewith. Pinion 156 is carried by shaft 157 which is journaled in plate 149 and on the end extending to the other side of plate 149 carries spacer disc 158 and clutch housing 159. Secured to housing 159 by screws 160 is clutch plate assembly 161 comprising tubular sleeve 162, ring 163 and clutch plate 164 which is secured to diametrically opposed carrier pins 165 which are slidably mounted in housing 159 and biased into an engaging position by springs 166. Shaft 167 is journaled in plate 148 and in alignment with shaft 157 by sleeves 168 and 169, sleeve 169 being freely rotatable on said shaft. On the end extending toward shaft 157, sleeve 169 has an assembly fixed thereto comprising a large spur gear 170 to the shoulder 171 of which is secured a gear 172, and a clutch member 173 fixed to said sleeve 169 and engageable by clutch plate 164, the lower surface of plate 164 and the surface of member 173 facing plate 164 normally being in engagement, but shown partially separated in FIG. 5 for clarity. The end of shaft 167 carries a pin 174 which extends through slot 175 in sleeve 162 and engages clutch plate 164 to move said clutch plate 164 axially against the action of spring 166 to disengage clutch plate 164 from clutch 173 upon axial movement of shaft 167. On the end of shaft 167 extending beyond plate 148, knob 31 is affixed thereto for rotating said shaft. Since clutch plate 164 and clutch 173 are normally engaged, rotation of knob 31 imparts rotation to shaft 157 and pinion 156 causing block 154, bracket 130 and viewing station 50 to be moved along rods 132 to the left or right, depending on the direction of rotation of knob 31.

To the left of knob 31, scan knob 33 is fixed to the end of shaft 176 extending beyond casing 21. Shaft 176 is journaled in plates 148 and 149 and between said plates has a gear 177 fixed thereto which meshes with gear 170 and carries a grooved cam 178. A strap 179, which is fixed to block 153 by screws 180, carries a follower 181 which engages the groove in cam 178. If it is assumed that shaft 176 is not interconnected to shaft 167 by gears 177 and 170, then rotation of shaft 176 will rotate cam 178 which will impart a reciprocatory motion to follower 181, strap 179 and block 153 to move viewing station 50 along rods 131 in a direction at right angles to that imparted by knob 31. However, since rack 155 and pinion 156 intermesh and have helical teeth, this reciprocatory movement of block 153 is resolved into an oblique movement so that the resultant movement is determined by the helical angle of the teeth on rack 155 and pinion 156.

Since gears 170 and 177 intermesh and clutch plate 164 and clutch 173 are normally engaged, rotation of knob 31 serves to drive shafts 167, 157 and 176. With reference to FIG. 4, if it is assumed that viewing station 50 is so positioned that axis 61 is aligned with the center of image 1, then rotation of knob 31 in a clockwise direction will cause pinion 156 and rack 155 to move viewing station 50 to the left. At the same time, gear 170 drives gear 177 and cam 178 is rotated a half turn to move viewing station 50 along rods 131. As mentioned above, however, this movement is resolved into an oblique movement along the teeth of rack 155. The movement due to rack 155 and pinion 156 is designated in FIG. 4 by OC. The oblique movement due to cam 178 and rack 155 is designated by OA. The resultant movement which occurs because both of the previously mentioned movements occur simultaneously is OB. As a result, the center of image 2 is then aligned with axis 61. With further rotation of knob 31, BD represents the movement due to rack 155 and pinion 156 and BC is the movement due to cam 178 and rack 155. The resultant movement is BE which positions the center of image 3 with respect to axis 61. While FIG. 4 designates movement of axis 61 or point O with respect to element 15, it should be evident from the description that element 15 is actually moved with respect to axis 61 or point O. The resultant movements OB and BE serve to position the images successively and in predetermined order with respect to axis 61, as indicated by the pattern of arrows in FIG. 4. These movements are, however, dependent on the chosen helical angle of rack 155 and pinion 156, as well as the reciprocatory movement imparted by cam 178. As a result, by varying either or both of these factors, the resultant movements can be varied in accordance with any necessary requirements.

To provide the operator with a means for sensing the location of an image, gear 172 has a plate 182 fixed thereto, said plate being provided with twelve angularly spaced apertures 183 for engaging the spring-biased ball 184 mounted in plate 148, as shown in FIG. 6. In addition, a visual indication of the image in position with respect to the optical axis is given the operator by means of numerals carried on disc 185 and visible to the operator adjacent the screen. Disc 185 is secured to gear 186 which is freely rotatable on stud 187 mounted in plate 148 and which meshes with gear 172. Also knob 31 is provided with a disc 192 having numerals corresponding to those on disc 185.

The movement of knob 31 and, hence, the movement of viewing station 50 is limited by stop arm 188 which is fixed to disc 158 and which engages a pin 189 extending inwardly from plate 149. The relation of pin 189 and arm 188 is such that knob 31 imparts not quite a full revolution of movement to shafts 157 and 167. Disc 158 also carries a pin 190 which engages switch 191 mounted on the inner surface of plate 149 and retains said switch in a closed position only when viewing station 50 is in position to align image 1 with the optical axis.

For purposes of scanning images larger than those indicated on element 15 so that the order of viewing cannot be followed or for rapidly locating a particular image, clutch plate 164 and clutch 173 can be disengaged by moving knob 31 inwardly whereby pin 174 moves clutch plate 164 axially against the action of springs 166, the driving connection between shafts 157 and 167 being retained by pin 174 and slot 175 in sleeve 162 and the driving connection between shafts 157—167 and shaft 176 being broken. When knob 31 is moved inwardly, lock button 32 is moved to the right by spring 198 to disengage the end of slide 193 from the annular recess 194 in shaft 176 and to move retainer 195 on slide 193 into engagement with annular recess 196 on shaft 167 to lock said shaft in position, slide 193 being retained on plate 148 by studs 197 and biased to the right by leaf spring 198. Knob 31 can then be rotated independently of knob 33, which, in turn, can be moved axially and, only axially, independently of knob 31 because knob 33 is freely rotatable on shaft 176. When recess 194 is aligned with the end of slide 193, button 32 can be moved to the left to release shaft 167.

With independent rotation of knob 31 or movement of knob 33, it is necessary to provide means for indicating to the operator that viewing station 50 is properly oriented with respect to the image number indicated on disc 185 so that upon return of the element to the image 1 position the transfer of the element can be properly accomplished. On the inner surface of plate 148, a lever 200 is pivotally mounted on stud 201 and is biased by spring 202 so that surface 203 thereof will normally abut pin 204, lever 200 being maintained in the position shown in FIG. 7 in which surface 205 abuts pin 204 by pin 206 on the shoulder 171 of gear 170 when viewing station 50 is properly positioned with respect to axis 61 so that image 1 is aligned with said axis. This is the normal position and the only position in which an element can be transferred to and from viewing station 50. In this position, discs 185 and 192 will indicate image 1, and the end 207 of lever 200 will permit movement of the transport means into relation with respect to viewing station 50. With rotation of knob 31 to position image 2, pin 206 is moved with gear 170 and permits spring 202 to move lever 200 so surface 203 abuts pin 204 and end 207 is positioned to prevent movement of the transport means into relation with respect to viewing station 50. In order to reinsert the transport means in viewing station 50, it is therefore necessary to return pin 206 to its normal position in order to rock lever 200 into the position in which end 207 is removed from the path of vertical movement of lever 122 into slot 89.

Since knob 33 is freely rotatable on shaft 176, shaft 176 can only be moved axially so that any previous movement of disc 185 does not disturb the image number indicated. If clutch plate 164 and clutch 173 are subsequently disengaged and knob 31 is rotated, gears 170, 172 and 186 do not turn due to the keying effect of ball 184 in engagement with plate 182. If the operator disengages clutch plate 164 and clutch 173 when image 4 is in position with respect to the optical axis and then performs the scanning operation, it is possible to inadvertently engage clutch plate 164 and clutch 173 in any position of knob 31. For example, the disc 185 may indicate the image 4 position and the disc 192 may indicate the image 6 position when clutch engagement takes place. If the operator now turns knob 31 in the direction to position image 1 with respect to axis 61, stop arm 188 will arrest motion of knob 31 when disc 185 indicates image 1 and disc 192 indicates image 3. Since knob 31 cannot be turned, the operator, upon checking disc 185 against disc 192, realizes that the clutch must again be disengaged in order to adjust both discs to the same image indication in order to phase the operation. This condition will also be evident to the operator because end 207 will prevent movement of the transport means into position with respect to the viewing station. On the other hand, if the clutch is re-engaged with disc 192 indicating image 2, then on rotation of knob 31 to reset viewing station 50, pin 206 will move lever 200 so that surface 205 abuts pin 204 to arrest knob 31, end 207 permitting the transport means to be moved upward. However, in this position disc 185 will indicate image 3 and transfer of element 15 cannot be effected because pin 190 on disc 158 has not closed switch 191. In this case the clutch must be disengaged and knob 31 rotated until discs 185 and 192 indicate image 3 and at that time is then returned to the image 1 position upon further rotation of knob 31.

From the description thus far, it is evident that the mechanism for moving viewing station 50 and, hence, element 15 normally provides an intermittent type of motion which successively and in a predetermined order presents each image in relation to the optical axis for projection and viewing. Also, by means of the controls associated therewith, and described in the above patent, it is impossible to effect transfer of an element 15 from the transport means to viewing station 50, or vice versa, without station 50 being aligned in a predetermined position with respect to the optical axis.

When an element 15 is positioned in viewing station 50, image 1 thereon will be projected upon the screen and both discs 185 and 192 will indicate this same image number. Knob 31 is then turned by the operator and the images are projected successively and in predetermined order onto screen 24. The first movement of knob 31 moves pin 190 away from switch 191 to permit said switch to open so that movement of the transport means into viewing station 50 will not affect any transfer of the vacuum or element 15. After all of the images have been viewed and the selection of images desired has been made, knob 31 is rotated in the opposite direction until discs 185 and 192 again indicate that image 1 is aligned with the optical axis, switch 191 again being closed by pin 190 when viewing station 50 is in its predetermined position. The possibilities of misphasing which can occur upon disengagement of the clutch for purposes of scanning have been described above in connection with the mechanism for moving viewing station 50.

Since other modifications of the invention will be apparent to those skilled in the art, the foregoing description is deemed to be only illustrative of the invention, the scope of which is defined by the appended claims.

Having now particularly described our invention, what we desire to secure by Letters Patent of the United States and what we claim is:

1. In a device for moving an element in a fixed plane and relative to an axis normal to the plane of said element comprising means for supporting said element in relation to said axis, means for mounting said supporting means to permit movement of said element in directions normal to each other in said fixed plane and relative to said axis, a first means operatively connected to said supporting means for moving said element in one of said directions and for resolving movement of said element in the other direction into oblique movement relative to said axis, a second means operatively connected to said supporting means for moving said element in the other direction relative to said axis, and drive means interconnecting said first and said second moving means for simultaneous operation thereof whereby the resultant movement of said element relative to said axis is the vector sum of the movement in said one direction and said oblique movement.

2. In a device for moving an element in a fixed plane and relative to an axis normal to the plane of said element comprising means for supporting said element in relation to said axis, means for mounting said supporting means to permit movement of said element transversely and longitudinally in said fixed plane relative to said axis, a first means operatively connected to said supporting means for moving said element longitudinally relative to said axis and for resolving transverse movement of said element into oblique movement thereof relative to said axis, a second means operatively connected to said supporting means for moving said element transversely relative to said axis, and drive means interconnecting said first and said second moving means for simultaneous operation thereof whereby the resultant movement of said element relative to said axis is the vector sum of the longitudinal and oblique movements.

3. In a device for moving an element in a fixed plane and relative to an axis normal to the plane of said element comprising means for supporting said element in relation to said axis, means for mounting said supporting means to permit movement of said element transversely and longitudinally in said fixed plane relative to said axis, means operatively connected to said supporting means for moving said element longitudinally relative to said axis and for resolving transverse movement of said element into oblique movement thereof relative to said axis, means operatively connected to said supporting means for reciprocating said element transversely relative to said axis, and drive means interconnecting said moving means and said reciprocating means for simultaneous operation thereof whereby the resultant movement of said element relative to said axis is the vector sum of the longitudinal and oblique movements to provide transverse movement when said reciprocating means moves said element in one direction and less oblique movement when said reciprocating means moves said element in the other direction.

4. In a device for moving an element in a fixed plane and relative to an axis normal to the plane of said element comprising means for supporting said element in relation to said axis, means for mounting said supporting means to permit movement of said element transversely and longitudinally in said fixed plane relative to said axis, means operatively connected to said supporting means for moving said element longitudinally relative to said axis and for resolving transverse movement of said element into oblique movement thereof relative to said axis, means operatively connected to said supporting means for moving said element transversely relative to said axis, means normally interconnecting each of said moving means for simultaneous operation thereof to provide a resultant movement of said element relative to said axis which is the vector sum of the longitudinal and oblique movements, and means for disengaging said interconnecting means to permit independent operation of each of said moving means.

5. In a device for moving an element in a fixed plane and relative to an axis normal to the plane of said element comprising means for supporting said element in relation to said axis, means for mounting said supporting means to permit movement of said element transversely and longitudinally in said fixed plane relative to said axis, means operatively connected to said supporting means for moving said element longitudinally relative to said axis and for resolving transverse movement of said element into oblique movement thereof relative to said axis, cam means operatively connected to said supporting means for reciprocating said element transversely relative to said axis, means normally interconnecting said moving means and said cam means for simultaneous operation thereof to provide a resultant movement of said element relative to said axis which is the vector sum of the longitudinal and oblique movements, said element being moved only transversely when said supporting means is moved in one direction by said cam means and less obliquely when said supporting means is moved in the other direction by said cam means, and means for disengaging said interconnecting means to permit independent operation of said moving means and said cam means.

6. In a device for alternately moving an element transversely and obliquely in a fixed plane and relative to an axis normal to the plane of said element to successively position adjacent areas on said element with respect to said axis comprising means for supporting said element in relation to said axis, means for mounting said supporting means to permit movement of said element transversely and longitudinally in said fixed plane relative to said axis, means for moving said element longitudinally relative to said axis and including a helical rack fixed to said supporting means and a helical gear rotatably mounted for engaging said rack, the helical angle of said rack and gear being determined by one-half the center distance between adjacent longitudinal areas and the center distance between adjacent transverse areas to resolve transverse movement of said element relative to said axis into oblique movement corresponding to said helical angle, means operatively connected to said supporting means for reciprocating said element transversely relative to said axis, and drive means interconnecting said gear and said reciprocating means for simultaneous movement thereof whereby the resultant movement of said element relative to said axis is the vector sum of the longitudinal and oblique movements to provide only transverse movement when said reciprocating means moves said element in one direction and a less oblique movement when said reciprocating means moves said element in the other direction.

7. In a device for alternately moving an element transversely and obliquely in a fixed plane and relative to an axis normal to the plane of said element to successively position longitudinally and transversely adjacent areas on said element with respect to said axis comprising means for supporting said element in relation to said axis, means for mounting said supporting means to permit movement of said element transversely and longitudinally in said fixed plane relative to said axis, means for moving said element longitudinally relative to said axis, and including a helical rack fixed to said supporting means and a helical gear rotatably mounted for engaging said rack, the helical angle of said rack and gear being determined by one-half the center distance between adjacent longitudinal areas and the center distance between adjacent transverse areas to resolve transverse movement of said element relative to said axis into oblique movement corresponding to said helical angle, cam means operatively connected to said supporting means for reciprocating said element transversely relative to said axis and between the centers of adjacent transverse areas, and drive means interconnecting said gear and said cam means for simultaneous movement thereof whereby the resultant movement of said element relative to said axis is the vector sum of the longitudinal and oblique movements to provide only transverse movement when said cam means moves said element in one direction and a less oblique movement when said cam means moves said element in the other direction.

8. In a device for moving an element transversely and obliquely in a fixed plane and relative to an axis normal to the plane of said element to successively position longitudinally and transversely adjacent areas on said element with respect to said axis and independently thereof any portion of said areas with respect to said axis comprising means for supporting said element in relation to said axis, means for mounting said supporting means to permit movement of said element transversely and longitudinally in said fixed plane relative to said axis, means for moving said element longitudinally relative to said axis and including a helical rack fixed to said supporting means and a helical gear rotatably mounted for engaging said rack, the helical angle of said rack and gear being determined by one-half the center distance between adjacent longitudinal areas and the center distance between adjacent transverse areas to resolve transverse movement of said element relative to said axis into oblique movement corresponding to said helical angle, cam means operatively connected to said supporting means for reciprocating said element transversely relative to said axis and between the centers of adjacent transverse areas, means normally interconnecting said moving means and said cam means for simultaneous movement thereof to provide a resultant movement of said element relative to said axis which is the vector sum of the longitudinal and oblique movements, said element being moved only transversely when said supporting means is moved in one direction by said cam means and less obliquely when said supporting means is moved in the other direction by said cam means, and means for disengaging said interconnecting means to permit independent operation of said moving means and said cam means for positioning any portion of said areas with respect to said axis.

References Cited in the file of this patent

UNITED STATES PATENTS

| | | |
|---|---|---|
| 703,047 | Dieckmann | June 24, 1902 |
| 1,391,859 | Schulze | Sept. 27, 1921 |
| 2,003,387 | Ott | June 4, 1935 |
| 2,338,400 | Bogue | Jan. 4, 1944 |
| 2,500,604 | Daniel | Mar. 14, 1950 |
| 2,563,702 | Benford | Aug. 7, 1951 |
| 2,677,987 | Galasch | May 11, 1954 |
| 2,933,938 | Glaser | Apr. 26, 1960 |

FOREIGN PATENTS

| | | |
|---|---|---|
| 143,120 | Great Britain | May 20, 1920 |